US012417731B2

(12) United States Patent
Park et al.

(10) Patent No.: US 12,417,731 B2
(45) Date of Patent: Sep. 16, 2025

(54) DISPLAY DEVICE HAVING CAPACITOR INCLUDING INTERMEDIATE AREA

(71) Applicant: Samsung Display Co., Ltd., Yongin-si (KR)

(72) Inventors: Youngwoo Park, Yongin-si (KR); Young-In Hwang, Yongin-si (KR); Sungwook Kim, Yongin-si (KR); Jeong-Soo Lee, Yongin-si (KR); Wan-Soon Im, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/503,984

(22) Filed: Nov. 7, 2023

(65) Prior Publication Data

US 2024/0169901 A1 May 23, 2024

(30) Foreign Application Priority Data

Nov. 16, 2022 (KR) ........................ 10-2022-0153394

(51) Int. Cl.
*G09G 3/32* (2016.01)

(52) U.S. Cl.
CPC ....... *G09G 3/32* (2013.01); *G09G 2300/0426* (2013.01); *G09G 2320/0247* (2013.01)

(58) Field of Classification Search
CPC ............................... G09G 3/32; G09G 3/3233
See application file for complete search history.

(56) References Cited

U.S. PATENT DOCUMENTS 10,930,210 B2 2/2021 Lee et al.
2015/0021561 A1* 1/2015 Jeon .................... H01L 27/1222 257/40
2017/0330928 A1* 11/2017 Choi .................... H10D 86/441
2017/0358262 A1* 12/2017 Moon .................. G09G 3/3225
2020/0258970 A1* 8/2020 Park ........................ H10K 71/00
2020/0403059 A1* 12/2020 Oh ..................... H10K 59/1213
(Continued)

FOREIGN PATENT DOCUMENTS

CN 114694586 A * 7/2022 ........... G09G 3/3225
KR 20170141304 A * 12/2017 ........... G09G 3/3233
(Continued)

*Primary Examiner* — Ida M Soward
(74) *Attorney, Agent, or Firm* — Womble Bond Dickinson (US) LLP

(57) ABSTRACT

A display device includes a light-emitting element, a driving element to apply a driving current, a 1-1 switching element including a first electrode connected to a gate electrode of the driving element, a gate electrode, and a second electrode connected to a first intermediate node, a 1-2 switching element including a first electrode connected to the first intermediate node, a gate electrode, and a second electrode connected to a second electrode of the driving element, a 2-1 switching element including a first electrode connected to a second intermediate node, a gate electrode, and a second electrode connected to the gate electrode of the driving element, a 2-2 switching element including a first electrode, a gate electrode, and a second electrode connected to the second intermediate node, and a capacitor including a first electrode to receive a power voltage, and a second electrode connected to the first and second intermediate nodes.

6 Claims, 14 Drawing Sheets

(56) References Cited

U.S. PATENT DOCUMENTS

| | | | | |
|---|---|---|---|---|
| 2021/0043139 | A1* | 2/2021 | Cha | G09G 3/3233 |
| 2021/0111239 | A1* | 4/2021 | Cho | H10D 86/431 |
| 2021/0125557 | A1* | 4/2021 | Na | G09G 3/3266 |
| 2021/0241689 | A1* | 8/2021 | Lee | G09G 3/3233 |
| 2021/0249498 | A1* | 8/2021 | Cho | H10K 50/80 |
| 2021/0257525 | A1* | 8/2021 | Ryu | H01L 33/62 |
| 2021/0343234 | A1* | 11/2021 | Yoon | G09G 3/3225 |
| 2021/0359055 | A1* | 11/2021 | Lee | H10K 59/1213 |
| 2022/0208932 | A1* | 6/2022 | Yun | H10K 59/131 |
| 2022/0344424 | A1* | 10/2022 | Kim | H10K 71/00 |
| 2024/0212593 | A1* | 6/2024 | Li | G09G 3/3225 |
| 2024/0265865 | A1* | 8/2024 | Wang | G09G 3/3233 |

FOREIGN PATENT DOCUMENTS

| | | | |
|---|---|---|---|
| KR | 10-2020-0009171 | A | 1/2020 |
| KR | 10-2020-0015862 | A | 2/2020 |
| KR | 10-2020-0142638 | A | 12/2020 |
| KR | 10-2021-0022807 | A | 3/2021 |
| KR | 10-2022-0030416 | A | 3/2022 |

* cited by examiner

T3:T3-1,T3-2
T4:T4-1,T4-2

DISPLAY DEVICE HAVING CAPACITOR INCLUDING INTERMEDIATE AREA

CROSS-REFERENCE TO RELATED APPLICATION(S)

This application claims priority to, and the benefit of, Korean Patent Application No. 10-2022-0153394, filed on Nov. 16, 2022, which is hereby incorporated by reference for all purposes as if fully set forth herein.

BACKGROUND

1. Field

Embodiments relate to a display device.

2. Description of the Related Art

A display device is a device that displays an image for providing visual information to a user. Among display devices, an organic light-emitting diode display has recently attracted attention.

Meanwhile, recently, there has been a growing demand for technology for reducing power consumption of a display device. Accordingly, a low-frequency driving method for driving a display device at a relatively low frequency has been studied.

In the case of the low frequency driving method, the leakage current of the pixel circuit may increase. Accordingly, a difference in pixel luminance between consecutive frames may occur.

SUMMARY

Embodiments provide a display device with improved quality.

A display device according to one or more embodiments includes a light-emitting element, a driving element configured to apply a driving current to the light-emitting element, a 1-1 switching element including a first electrode connected to a gate electrode of the driving element, a gate electrode, and a second electrode connected to a first intermediate node, a 1-2 switching element including a first electrode connected to the first intermediate node, a gate electrode, and a second electrode connected to a second electrode of the driving element, a 2-1 switching element including a first electrode connected to a second intermediate node, a gate electrode, and a second electrode connected to the gate electrode of the driving element, a 2-2 switching element including a first electrode, a gate electrode, and a second electrode connected to the second intermediate node, and a capacitor including a first electrode configured to receive a power voltage, and a second electrode connected to the first intermediate node and to the second intermediate node.

A width of a channel area of the 1-1 switching element may be different from a width of a channel area of the 1-2 switching element.

The width of the channel area of the 1-2 switching element may be greater than the width of the channel area of the 1-1 switching element.

A width of a channel area of the 2-1 switching element may be different from a width of a channel area of the 2-2 switching element.

The width of the channel area of the 2-2 switching element may be greater than the width of the channel area of the 2-1 switching element.

The display device may further include a first scan line that transmits a compensation gate signal.

The display device may further include a second scan line that transmits a data initialization gate signal.

A display device according to one or more embodiments includes an active pattern including first, second, third, and fourth channel areas, an intermediate area, and first, second, third, fourth, and fifth areas, a first gate electrode above the active pattern, a second gate electrode above the first gate electrode, a first scan line above the second gate electrode, configured to transmit a gate signal, and partially overlapping the second channel area, a 2-2 switching element including the first channel area, a portion of the first area, a portion of the second area, and a first portion of the first gate electrode that overlaps the first channel area, a 2-1 switching element including the second channel area, a portion of the second area, a portion of the third area, and a second portion of the first gate electrode that overlaps the second channel area, a 1-1 switching element including the third channel area, a portion of the third area, a portion of the fourth area, and a third portion of the first gate electrode that overlaps the third channel area, a 1-2 switching element including the fourth channel area, a portion of the fourth area, a portion of the fifth area, and a fourth portion of the first gate electrode that overlaps the fourth channel area, and a capacitor including the intermediate area, and a part of the second gate electrode that overlaps the intermediate area.

A width of the first channel area may be greater than a width of the second channel area.

A width of the fourth channel area may be greater than a width of the third channel area.

The second gate electrode may include a first portion extending in a first direction, a second portion extending in a second direction that crosses the first direction, and a third portion protruding from an end of the second portion to overlap the second channel area.

The first scan line may partially overlap the second portion of the second gate electrode.

The first scan line may partially overlap the intermediate area.

The gate signal may include a compensation gate signal.

A display device according to one or more embodiments includes an active pattern including first, second, third, and fourth channel areas, an intermediate area, and first, second, third, fourth, and fifth areas, a first gate electrode above the active pattern, a second gate electrode above the first gate electrode, a first scan line above the second gate electrode, configured to transmit a gate signal, and partially overlapping the third area, a 2-2 switching element including the first channel area, a portion of the first area, a portion of the second area, and a first portion of the first gate electrode that overlaps the first channel area, a 2-1 switching element including the second channel area, a portion of the second area, a portion of the third area, and a second portion of the first gate electrode that overlaps the second channel area, a 1-1 switching element including the third channel area, a portion of the third area, a portion of the fourth area, and a third portion of the first gate electrode that overlaps the third channel area, a 1-2 switching element including the fourth channel area, a portion of the fourth area, a portion of the fifth area, and a fourth portion of the first gate electrode that overlaps the fourth channel area, and a capacitor including the intermediate area and a part of the second gate electrode that overlaps the intermediate area.

A width of the first channel area may be greater than a width of the second channel area.

A width of the fourth channel area may be greater than a width of the third channel area.

The second gate electrode may include a first portion extending in a first direction, a second portion extending in a second direction that crosses the first direction, and a third portion protruding from an end of the second portion to overlap the second channel area.

The first scan line may partially overlap the intermediate area.

The gate signal may include a compensation gate signal.

Accordingly, there may be increased a capacity of a hold capacitor for compensating for a kickback voltage generated in a connection node for connecting compensation switching elements and in a connection node for connecting data initialization switching elements. Accordingly, the kickback voltage may decrease.

That is, the leakage current flowing from the compensation switching element to the gate node, and the leakage current flowing from the initialization switching element to the gate node, may decrease.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE DRAWINGS

Figure 1:
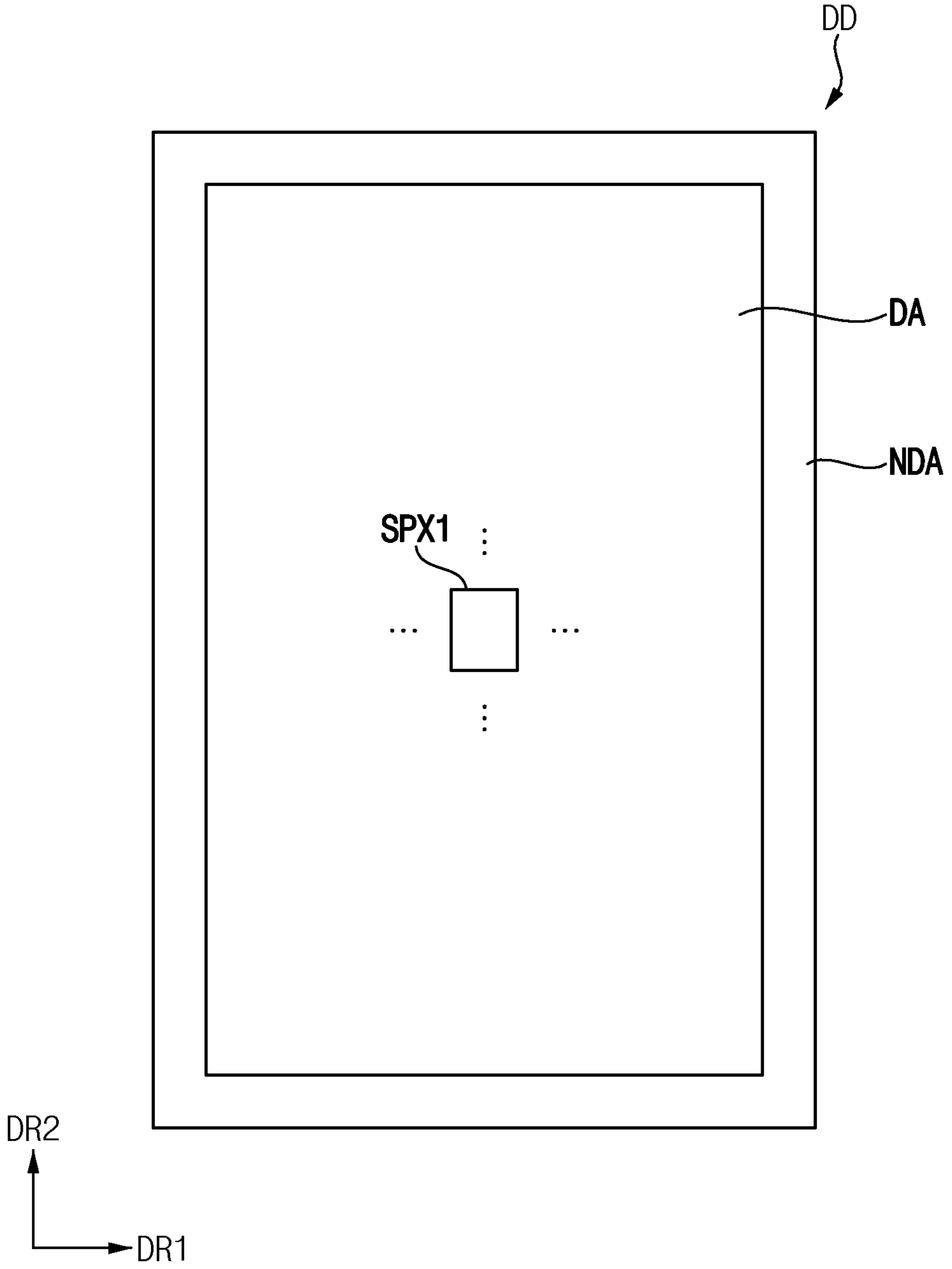
FIG. 1 is a plan view illustrating a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

The regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
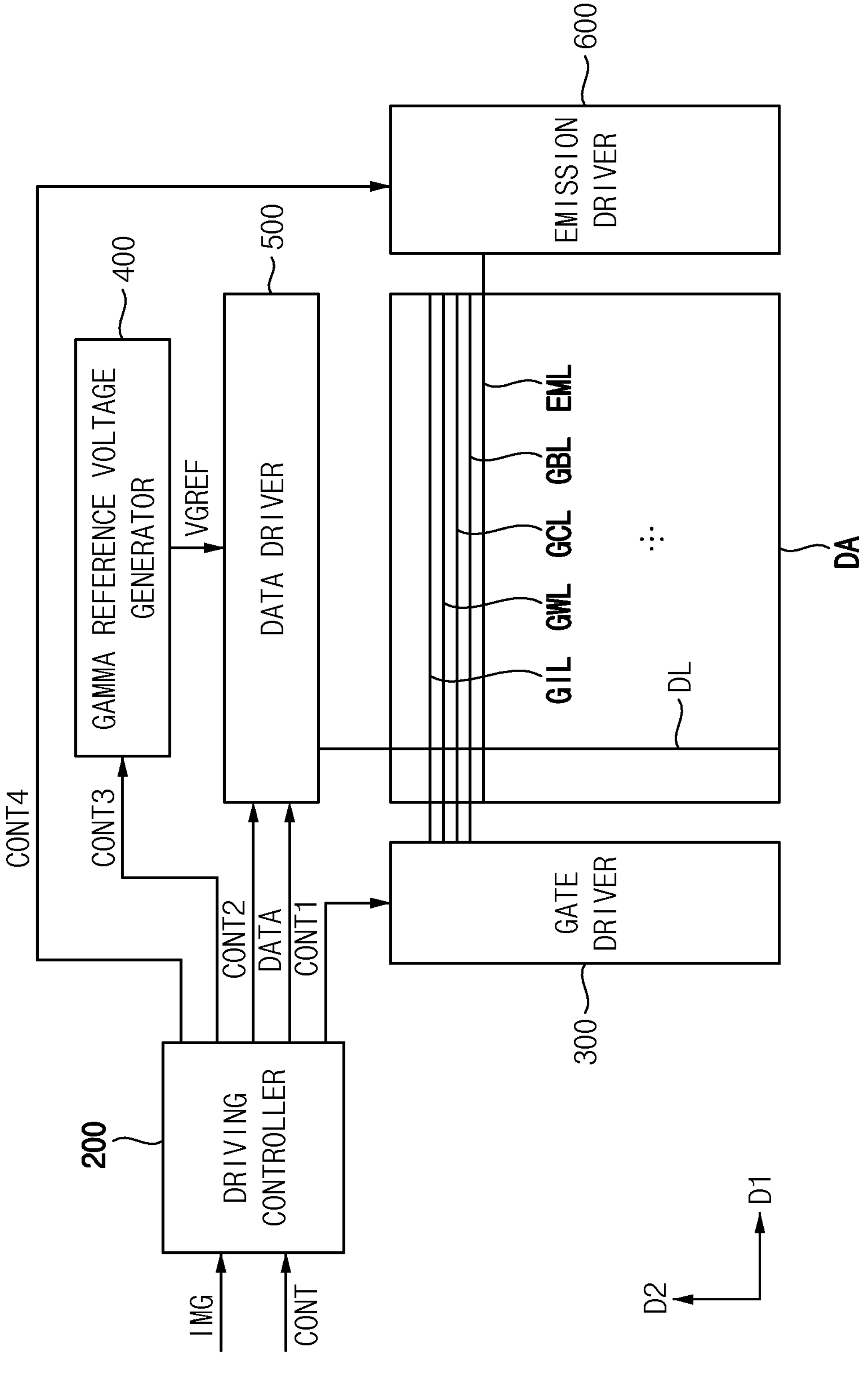
FIG. 2 is a block view illustrating the display device of FIG. 1.

FIG. 1 is a plan view illustrating a display device according to one or more embodiments. FIG. 2 is a block view illustrating the display device of FIG. 1.

Referring to FIG. 1, a display device DD according to one or more embodiments of the present disclosure may include a display area DA and a non-display area NDA. The display area DA may be defined as an area capable of generating light or displaying an image by adjusting a transmittance of light provided from an external light source. The non-display area NDA may be an area that does not display an image. In addition, the non-display area NDA may surround at least a portion of the display area DA (e.g., in plan view).

A plurality of pixels may be located in the display area DA. Each of the plurality of pixels may emit light. For example, a first sub-pixel SPX1 may emit light. The plurality of pixels may be repeatedly arranged along a first direction DR1, and along a second direction DR2 crossing the first direction DR1.

Referring to FIGS. 1 and 2, the non-display area NDA may include a driver. The driver may include a driving controller 200, a gate driver 300, a gamma reference voltage generator 400, a data driver 500, and an emission driver 600.

The display area DA may include a plurality of scan lines GIL, GWL, GCL, and GBL, a plurality of data lines DL, a plurality of emission lines EML, and the plurality of pixels electrically connected to each of the plurality of scan lines GIL, GWL, GCL, and GBL, the plurality of data lines DL, and the plurality of emission lines EML.

The plurality of scan lines GIL, GWL, GCL, and GBL and the plurality of emission lines EML may extend in the first direction DR1, and the plurality of data lines DL may extend in the second direction DR2.

The driving controller 200 may receive an input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate a first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate a second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate a third control signal CONT3 for controlling an operation of the gamma reference voltage generator 400 based on the input control signal CONT, and may output the third control signal CONT3 to the gamma reference voltage generator 400.

The driving controller 200 may generate a fourth control signal CONT4 for controlling an operation of the emission driver 600 based on the input control signal CONT, and may output the fourth control signal CONT4 to the emission driver 600.

The driving controller 200 may generate the data signal DATA based on the input image data IMG. The driving controller 200 may output the data signal DATA to the data driver 500.

The gate driver 300 may generate gate signals for driving the scan lines GWL, GIL, GCL, and GBL in response to the first control signal CONT1 input from the driving controller 200. The gate driver 300 may output the gate signals to the scan lines GWL, GIL, GCL, and GBL.

Figure 3:
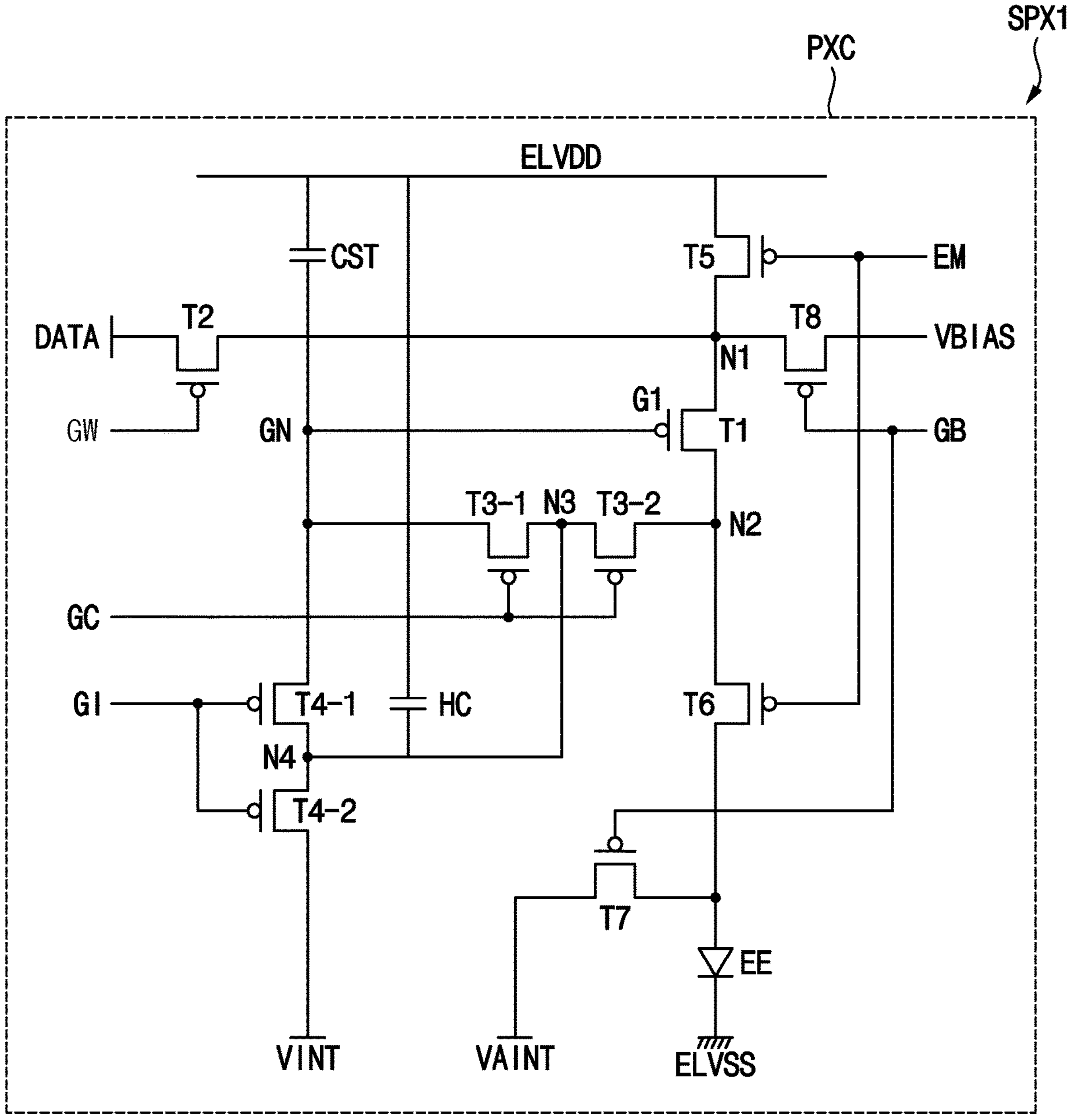
FIG. 3 is a circuit view illustrating a pixel included in the display device of FIG. 1.

The gate signals may include a data initialization gate signal (e.g., a data initialization gate signal GI of FIG. 3), a compensation gate signal (e.g., a compensation gate signal GC of FIG. 3), a data write gate signal (e.g., a data write gate signal GW of FIG. 3), and a bias gate signal (e.g., a bias gate signal GB of FIG. 3).

The gamma reference voltage generator 400 may generate the gamma reference voltage VGREF in response to the third control signal CONT3 input from the driving controller 200. The gamma reference voltage generator 400 may provide the gamma reference voltage VGREF to the data driver 500. The gamma reference voltage VGREF may have a value corresponding to data signal DATA.

For example, the gamma reference voltage generator 400 may be located in the driving controller 200, or may be located in the data driver 500.

The data driver 500 may receive the second control signal CONT2 and the data signal DATA from the driving controller 200. In addition, the data driver 500 may receive the gamma reference voltage VGREF from the gamma reference voltage generator 400. The data driver 500 may convert the data signal DATA into an analog type data voltage using the gamma reference voltage VGREF. The data driver 500 may output the data voltage to the data line DL.

The emission driver 600 may generate emission signals for driving the emission lines EML in response to the fourth control signal CONT4 input from the driving controller 200. The emission driver 600 may output the emission signals to the emission lines EML.

Although FIG. 2 illustrates that the gate driver 300 is located at a first side of the display area DA and the emission driver 600 is located at a second side of the display area DA, the present disclosure is not limited thereto. For example, both the gate driver 300 and the emission driver 600 may be located at the first side of the display area DA. For example, the gate driver 300 and the emission driver 600 may be integrally formed.

FIG. 3 is a circuit view illustrating a pixel included in the display device of FIG. 1.

Referring to FIGS. 2 and 3, the first sub-pixel SPX1 may include a pixel circuit PXC. The pixel circuit PXC may include a light-emitting element EE, a driving element T1, a data-applying switching element T2, a compensation switching element T3, a data-initializing switching element T4, a first emission switching element T5, a second emission switching element T6, a light-emitting-element-initialization switching element T7, a bias switching element T8, a storage capacitor CST, and a hold capacitor HC.

The driving element T1 may apply a driving current to the light-emitting element EE. The bias switching element T8 may be connected to a first electrode N1 of the driving element T1. The bias switching element T8 may apply the bias voltage VBIAS to the first electrode N1 of the driving element T1. In one or more embodiments, the first electrode N1 may be an input electrode of the driving element T1.

The data-applying switching element T2 may include a gate electrode to which the data write gate signal GW is applied, a first electrode to which the data voltage DATA is applied, and a second electrode connected to the first electrode N1 of the driving element T1. In one or more embodiments, the first electrode may be an input electrode of the data-applying switching element T2. In addition, the second electrode may be an output electrode of the data-applying switching element T2. The data-applying switching element T2 may apply the data voltage DATA to the first electrode N1 of the driving element T1.

The compensation switching element T3 may be connected to the gate electrode G1 of the driving element T1. In addition, the compensation switching element T3 may be connected to the second electrode N2 of the driving element T. In one or more embodiments, the compensation switching element T3 may include a first compensation switching element T3-1 and a second compensation switching element T3-2 connected in series.

The first compensation switching element T3-1 may include a gate electrode to which the compensation gate signal GC is applied, a first electrode connected to the gate electrode G1 of the driving element T1, and a second electrode connected to the first intermediate node N3. For example, the first electrode of the first compensation switching element T3-1 and the gate electrode G1 of the driving element T1 may be connected through a gate node GN. In one or more embodiments, the first electrode may be an input electrode of the first compensation switching element T3-1. In addition, the second electrode may be an output electrode of the first compensation switching element T3-1.

The second compensation switching element T3-2 may include a gate electrode to which the compensation gate signal GC is applied, a first electrode connected to the first intermediate node N3, and a second electrode connected to the second electrode N2 of the driving element T1. In one or more embodiments, the first electrode may be an input electrode of the second compensation switching element T3-2. In addition, the second electrode may be an output electrode of the second compensation switching element T3-2.

When the compensation switching element T3 is configured with two transistors T3-1 and T3-2 connected in series, the likelihood of reduction of a level of the data voltage DATA applied to the gate electrode G1 of the driving element T1 and stored in the storage capacitor CST (e.g., due to leakage current) may be reduced or prevented.

The data initialization switching element T4 may be connected to the gate electrode G1 of the driving element T1. The data initialization switching element T4 may apply the initialization voltage VINT to the gate electrode G1 of the driving element T1. In one or more embodiments, the data initialization switching element T4 may include a first data initialization switching element T4-1 and a second data initialization switching element T4-2 connected in series.

The first data initialization switching element T4-1 may include a gate electrode to which the data initialization gate signal GI is applied, a first electrode connected to the second intermediate node N4, and a second electrode connected to the gate electrode G1 of the driving element T1. For example, the second electrode of the first data initialization switching element T4-1 may be connected to the gate electrode G1 of the driving element T1 through the gate node GN. In one or more embodiments, the first electrode may be an input electrode of the first data initialization switching element T4-1. In addition, the second electrode may be an output electrode of the first data initialization switching element T4-1.

The second data initialization switching element T4-2 may include a gate electrode to which the data initialization gate signal GI is applied, a first electrode to which the initialization voltage VINT is applied, and a second electrode connected to the second intermediate node N4. In one or more embodiments, the first electrode may be an input electrode of the second data initialization switching element T4-2. In addition, the second electrode may be an output electrode of the second data initialization switching element T4-2.

When the data initialization switching element T4 is configured with two transistors T4-1 and T4-2 connected in series, a decrease of the level of the data voltage DATA applied to the gate electrode G1 of the driving element T1 and stored in the storage capacitor CST due to a leakage current may be reduced or prevented.

The first emission switching element T5 may include a first electrode to which a first power voltage ELVDD is applied, a gate electrode to which the emission signal EM is applied, and a second electrode connected to the first electrode N1 of the driving element T1. In one or more embodiments, the first electrode may be an input electrode of the first emission switching element T5. In addition, the second electrode may be an output electrode of the first emission switching element T5.

The second emission switching element T6 may include a first electrode connected to the second electrode N2 of the driving element T1, a gate electrode to which an emission signal EM is applied, and a second electrode connected to a first electrode of the light-emitting element EE. In one or more embodiments, the first electrode of the second emission switching element T6 may be an input electrode of the second emission switching element T6. In addition, the second electrode may be an output electrode of the second emission switching element T6.

The light-emitting-element-initialization switching element T7 may include a first electrode to which the light-emitting element initialization voltage VAINT is applied, a gate electrode to which the bias gate signal GB is applied, and a second electrode connected to the first electrode of the light-emitting element EE. In one or more embodiments, the first electrode of the light-emitting-element-initialization switching element T7 may be an input electrode of the light-emitting-element-initialization switching element T7.

In addition, the second electrode may be an output electrode of the light-emitting element initializing switching element T7.

The bias switching element T8 may include a first electrode to which the bias voltage VBIAS is applied, a gate electrode to which the bias gate signal GB is applied, and a second electrode connected to the first electrode N1 of the driving element T1. In one or more embodiments, the first electrode may be an input electrode. In addition, the second electrode may be an output electrode.

A second power voltage ELVSS may be applied to the second electrode of the light-emitting element EE. For example, the first power voltage ELVDD may be a high power voltage, and the second power voltage ELVSS may be a low power voltage.

The storage capacitor CST may include a first electrode to which the first power voltage ELVDD is applied, and a second electrode connected to the gate electrode G1 of the driving element T1. The storage capacitor CST may maintain the level of the data voltage DATA applied to the gate electrode G1 of the driving element T1.

The hold capacitor HC may include a first electrode to which the first power voltage ELVDD is applied and a second electrode connected to the first intermediate node N3 and the second intermediate node N4.

When the data initialization gate signal GI and the compensation gate signal GC are changed from a low signal to a high signal, a kickback voltage may be generated near the first intermediate node N3 and the second intermediate node N4. Accordingly, the leakage current flowing to the gate node GN and the gate electrode of the driving element T1 may be generated.

The display device DD of FIG. 1 may be driven at a low frequency. The lower the frequency at which the display device DD of FIG. 1 is driven, the higher the frequency of generation of flickers due to the leakage current. To reduce or prevent generation of the kickback voltage and the leakage current, the hold capacitor HC may be put in place. That is, the hold capacitor HC may compensate for the kickback voltage that may be generated near the intermediate nodes N3 and N4.

TABLE A

| | capacitance[pF] |
|---|---|
| First hold capacitor | 0.0092 |
| Second hold capacitor | 0.0108 |

Table [A] shows capacitance (in units of picofarads (pF)) of hold capacitors of a pixel circuit according to the comparative example. The pixel circuit according to the comparative example may include a first hold capacitor including a first electrode connected to the first power voltage ELVDD, and a second electrode connected to the first intermediate node N3. In addition, the pixel circuit may further include a second hold capacitor including a first electrode connected to the first power voltage ELVDD, and a second electrode connected to the second intermediate node N4. In this case, the first hold capacitor may have a capacity of about 0.0092 picofarad capacitance. In addition, the second hold capacitor may have a capacity of about 0.0108 picofarad capacitance.

TABLE B

| | capacitance[pF] |
|---|---|
| Hold capacitor | 0.0200 |

Table [B] shows capacitance of the hold capacitor HC of the pixel circuit PXC according to one or more embodiments of the present disclosure. The pixel circuit according to the comparative example may include the first hold capacitor and the second hold capacitor, whereas the pixel circuit PXC according to one or more embodiments of the present disclosure may include one common hold capacitor HC.

Accordingly, the capacity of the hold capacitor HC may increase. For example, the hold capacitor HC of the pixel circuit PXC according to one or more embodiments of the present disclosure may have a capacity of about 0.0200 picofarad capacitance. That is, by covalently using the hold capacitor, the capacity of the hold capacitor may be increased by about twice or more. Accordingly, by the following Equation [C], the kickback voltage may be reduced to about half or less.

$$Vkb \propto \frac{Cpa}{Cpa + Cnode}(VGH - VGL) \qquad \text{Equation [C]}$$

When the compensation gate signal GC transitions from a low signal to a high signal, the first compensation switching element T3-1 and the second compensation switching element T3-2 are turned off so that the first intermediate node N3 is maintained at a corresponding voltage level. However, the voltage level of the first intermediate node N3 may be changed by a parasitic capacitor generated from the first intermediate node N3.

In addition, when the data initialization gate signal GI transitions from a low signal to a high signal, the first data initialization switching element T4-1 and the second data initialization switching element T4-2 are turned off, and the second intermediate node N4 is maintained at a corresponding voltage level. However, the voltage level of the second intermediate node N4 may be changed by a parasitic capacitor generated in the second intermediate node N4.

In the Equation [C], the $V_{kb}$ may represent the kickback voltage. The $C_{pa}$ may mean the capacitance of the parasitic capacitor. The $C_{node}$ may refer to the capacity of the hold capacitor HC. The VGH may represent the voltage when the compensation gate signal GC and/or the data initialization gate signal GI is a high signal, and VGL may represent the voltage when the compensation gate signal GC and/or the data initialization gate signal GI is a low signal.

FIG. 3 may illustrate an example in which the pixel circuit PXC includes the light-emitting element EE, the driving element T1, the data-applying switching element T2, the compensation switching element T3, the data-initializing switching element T4, the first emission switching element T5, the second emission switching element T6, the light-emitting element initializing switching element T7, the bias switching element T8, the storage capacitor CST, and the hold capacitor HC. However, the present disclosure is not limited thereto. That is, some of the components of the pixel circuit PXC may be omitted. In addition, other configurations may be added. For example, the pixel circuit PXC may further include a second storage capacitor including a first electrode to which the first power voltage ELVDD is applied, and a second electrode connected to the first electrode N1 of the driving element T1.

FIGS. 4 to 10 are arrangement views illustrating the display device of FIG. 1.

Figure 4:
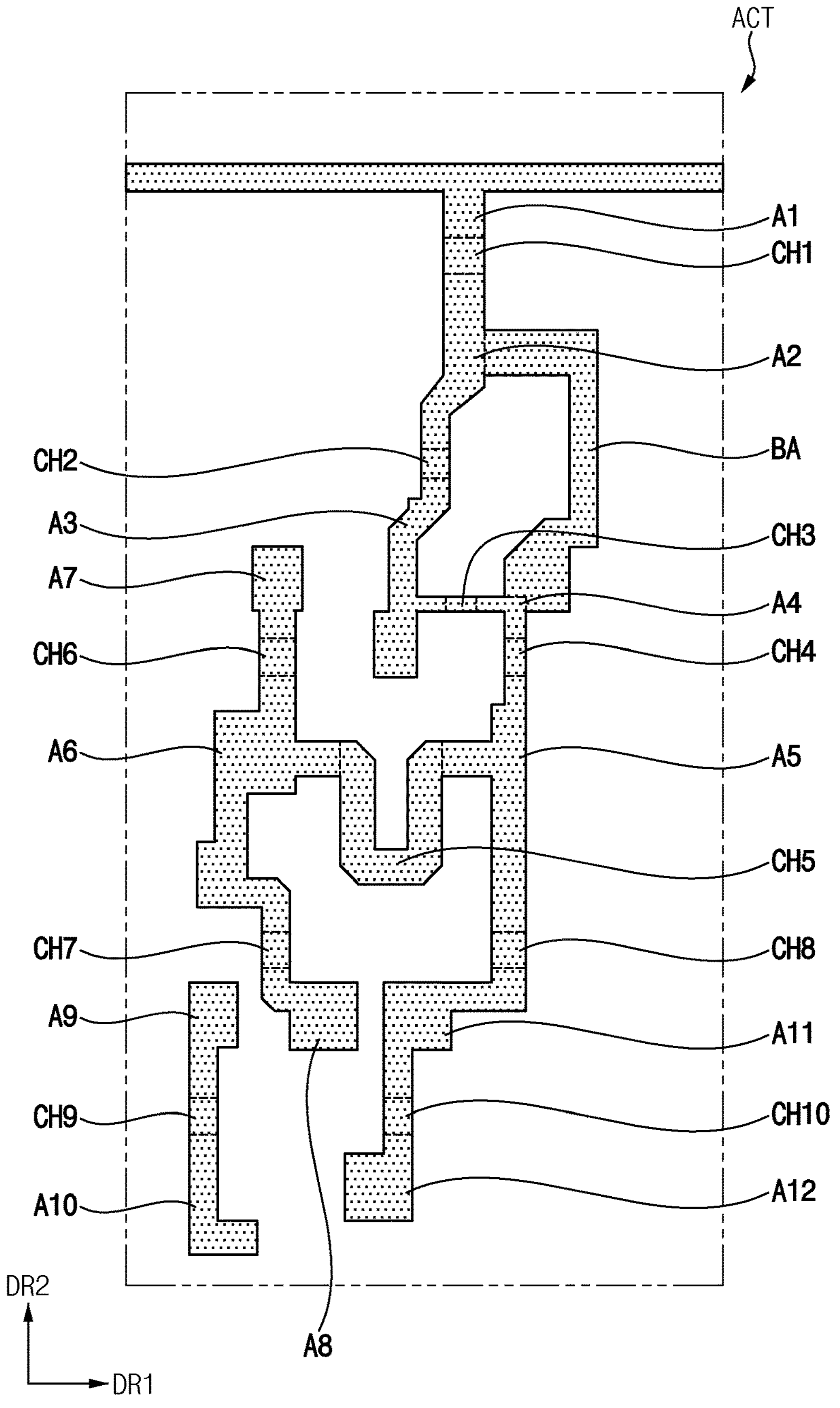
FIGS. 4 to 10 are arrangement views illustrating the display device of FIG. 1.

Referring to FIGS. 3 and 4, the display device (e.g., the display device DD of FIG. 1) may include an active pattern ACT. The active pattern ACT may include first to tenth channel areas CH1, CH2, CH3, CH4, CH5, CH6, CH7, CH8, CH9, CH10, and first to twelfth areas A1, A2, A3, A4, A5, A6, A7, A8, A9, A10, A11, A12 and an intermediate area BA.

The first channel area CH1 may be located between the first area A1 and the second area A2. The second channel area CH2 may be located between the second area A2 and the third area A3. The third channel area CH3 may be located between the third area A3 and the fourth area A4. The fourth channel area CH4 may be located between the fourth area A4 and the fifth area A5.

The fifth channel area CH5 may be located between the fifth area A5 and the sixth area A6. The sixth channel area CH6 may be located between the sixth area A6 and the seventh area A7. The seventh channel area CH7 may be located between the sixth area A6 and the eighth area A8. The eighth channel area CH8 may be located between the fifth area A5 and the eleventh area A11.

The ninth channel area CH9 may be located between the ninth area A9 and the tenth area A10. The tenth channel area CH10 may be located between the eleventh area A11 and the twelfth area A12. In addition, the intermediate area BA may be located between the second area A2 and the fourth area A4.

The active pattern ACT may include a metal oxide semiconductor (e.g., indium gallium zinc oxide (IGZO), an inorganic semiconductor (e.g., amorphous silicon, polysilicon), or an organic semiconductor. In one or more embodiments, the active pattern ACT may include an inorganic semiconductor.

Figure 5:
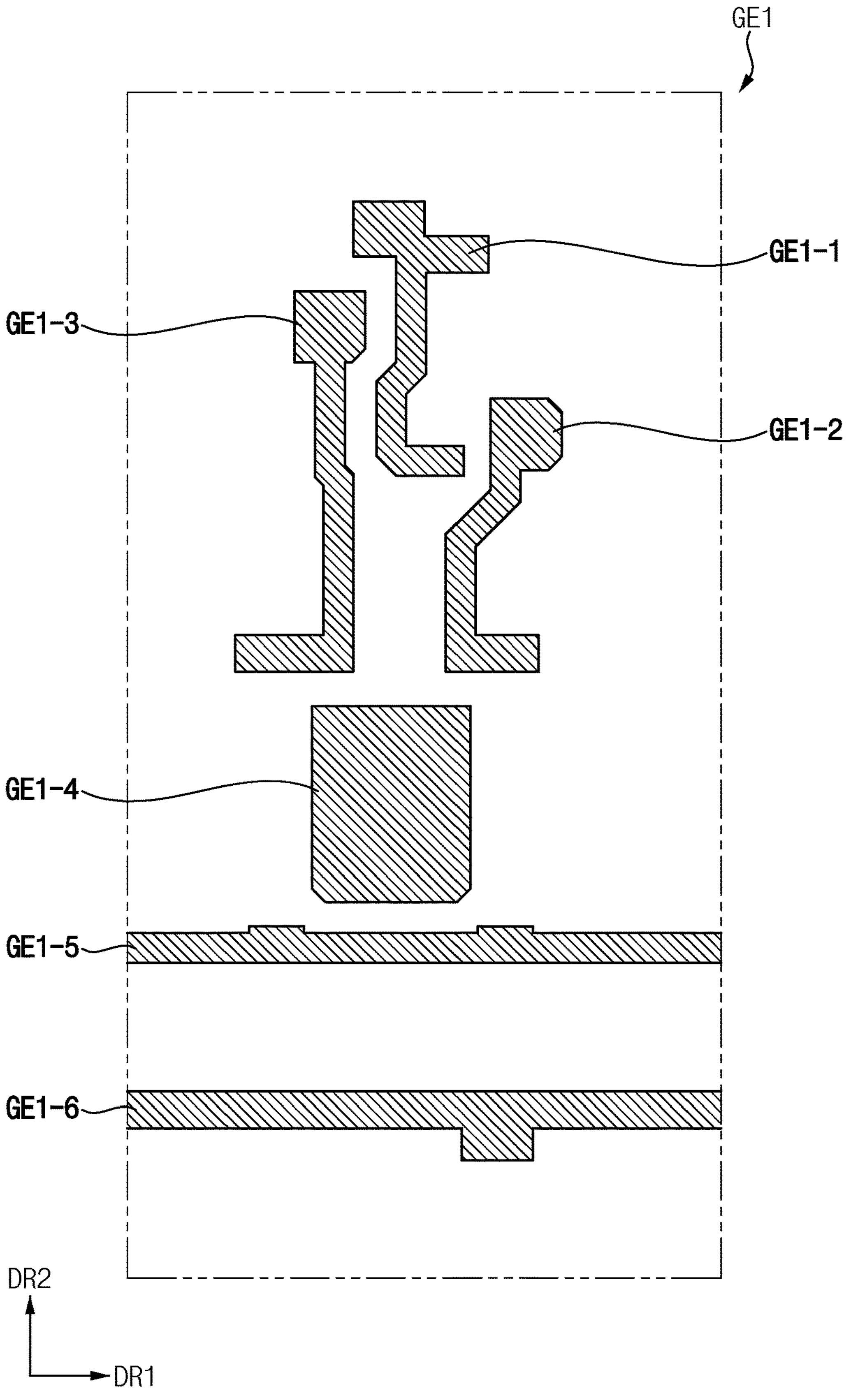
Figure 6:
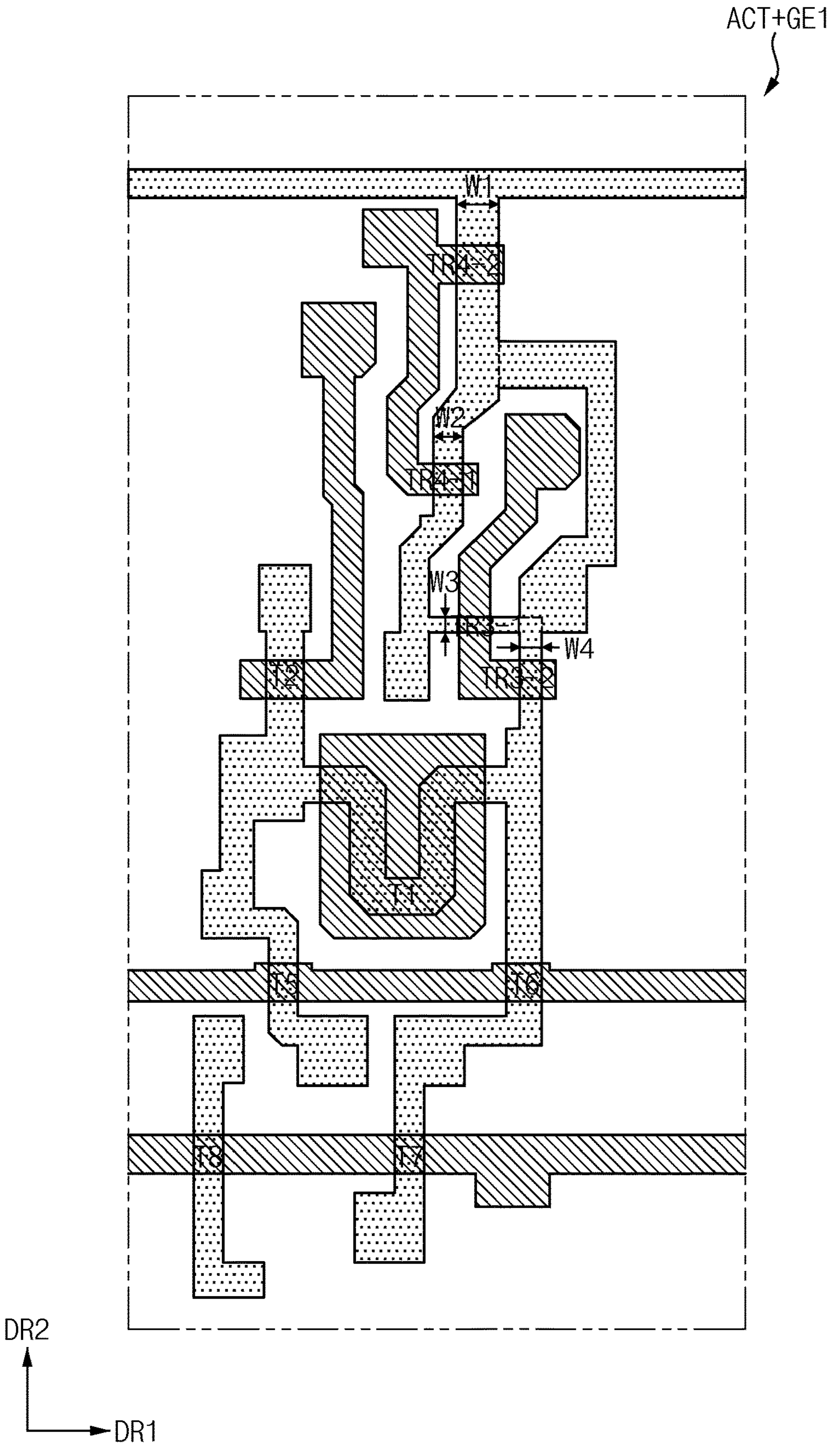

Referring to FIGS. 4 and 5, a first gate electrode GE1 may be located on (e.g., above) the active pattern ACT. The first gate electrode GE1 may include a 1-1 sub gate electrode GE1-1, a 1-2 sub gate electrode GE1-2, a 1-3 sub gate electrode GE1-3, a 1-4 sub gate electrode GE1-4, a 1-5 sub gate electrode GE1-5, and 1-6 sub gate electrode GE1-6.

The first gate electrode GE1 may include a metal, an alloy, a conductive metal oxide, a transparent conductive material, and the like. These materials may be used alone or in combination with each other.

Referring to FIGS. 3 to 6, the second data initialization switching element T4-2 may include a portion of the active pattern ACT (e.g., a portion of the first channel area CH1, the first area A1, and the second area A2) and a portion of the 1-1 sub gate electrode GE1-1 overlapping the first channel area CH1 of the active pattern ACT.

The first data initialization switching element T4-1 may include a portion of the active pattern ACT (e.g., a portion of the second channel area CH2, the second area A2, and the third area A3) and a portion of the 1-1 sub gate electrode GE1-1 overlapping the second channel area CH2 of the active pattern ACT.

The first compensation switching element T3-1 may include a portion of the active pattern ACT (e.g., a portion of the third channel area CH3, the third area A3, and the fourth area A4) and a portion of the 1-2 sub gate electrode GE1-2 overlapping the third channel area CH3 of the active pattern ACT.

The second compensation switching element T3-2 may include a portion of the active pattern ACT (e.g., a portion of the fourth channel area CH4, the fourth area A4, and the fifth area A5) and a portion of the 1-2 sub gate electrode GE1-2 overlapping the fourth channel area CH4 of the active pattern ACT.

The first data initialization switching element T4-1 and the second data initialization switching element T4-2 may be referred to as a 2-1 switching element and a 2-2 switching element, respectively. Furthermore, the first compensation switching element T3-1 and the second compensation switching element T3-2 may be referred to as a 1-1 switching element and a 1-2 switching element, respectively.

The driving element T1 may include a portion of the active pattern ACT (e.g., a portion of the fifth channel area CH5, the fifth area A5 and the sixth area A6) and a portion of the 1-4 sub gate electrode GE1-4 overlapping the fifth channel area CH5 of the active pattern ACT.

The data-applying switching element T2 may include a portion of the active pattern ACT (e.g., a portion of the sixth channel area CH6, the seventh area A7, and the sixth area A6), and a portion of the 1-3 sub gate electrode GE1-3 overlapping the sixth channel area CH6 of the active pattern ACT.

The first emission switching element T5 may include a portion of the active pattern ACT (e.g., a portion of the seventh channel area CH7, the sixth area A6, and the eighth area A8) and a portion of the 1-5 sub gate electrode GE1-5 overlapping the seventh channel area CH7 of the active pattern ACT.

The second emission switching element T6 may include a portion of the active pattern ACT (e.g., a portion of the eighth channel area CH8, the fifth area A5 and the eleventh area A11) and a portion of the 1-5 sub gate electrode GE1-5 overlapping the eighth channel area CH8 of the active pattern ACT.

The light-emitting-element-initialization switching element T7 may include a portion of the active pattern ACT (e.g., a portion of the tenth channel area CH10, the eleventh area A11, and the twelfth area A12) and a portion of the 1-6 sub gate electrode GE1-6 overlapping the tenth channel area CH10 of the active pattern ACT.

The bias switching element T8 may include a portion of the active pattern ACT (e.g., a portion of the ninth channel area CH9, the ninth area A9, and the tenth area A10) and a portion of the 1-6 sub gate electrode GE1-6 overlapping the ninth channel area CH9 of the active pattern ACT.

In one or more embodiments, the width W1 of the first channel area CH1 may be greater than the width W2 of the second channel area CH2. In addition, the width W4 of the fourth channel area CH4 may be greater than the width W3 of the third channel area CH3.

Accordingly, the leakage current flowing from the compensation switching element T3 to the gate electrode G1 of the driving element T1 may be reduced. That is, as the leakage current flowing from the compensation switching element T3 to the fifth area A5 increases, the leakage current flowing from the compensation switching element T3 to the gate electrode G1 of the driving element T1 may decrease.

In addition, the leakage current flowing from the data initialization switching element T4 to the gate electrode G1 of the driving element T1 may be reduced. That is, as the leakage current flowing from the data initialization switching element T4 to the first area A1 increases, the leakage current flowing from the data initialization switching element T4 to the gate electrode G1 of the driving element T1 may decrease.

In addition, when the level of the initialization voltage VINT is lowered, the voltage around the driving element T1 may be higher than the voltage around the first data initialization switching element T4-1 and the second data initialization switching element T4-2. That is, the voltage around the fifth channel area CH5 may be higher than the voltage around the first channel area CH1 and the second channel area CH2.

In this case, the leakage current may flow from the driving element T1 toward the second data initialization switching element T4-2. By setting the width of the first channel area CH1 to be greater than the width of the second channel area CH2, the leakage current flowing from the driving element T1 toward the second data initialization switching element T4-2 may increase.

Figure 7:
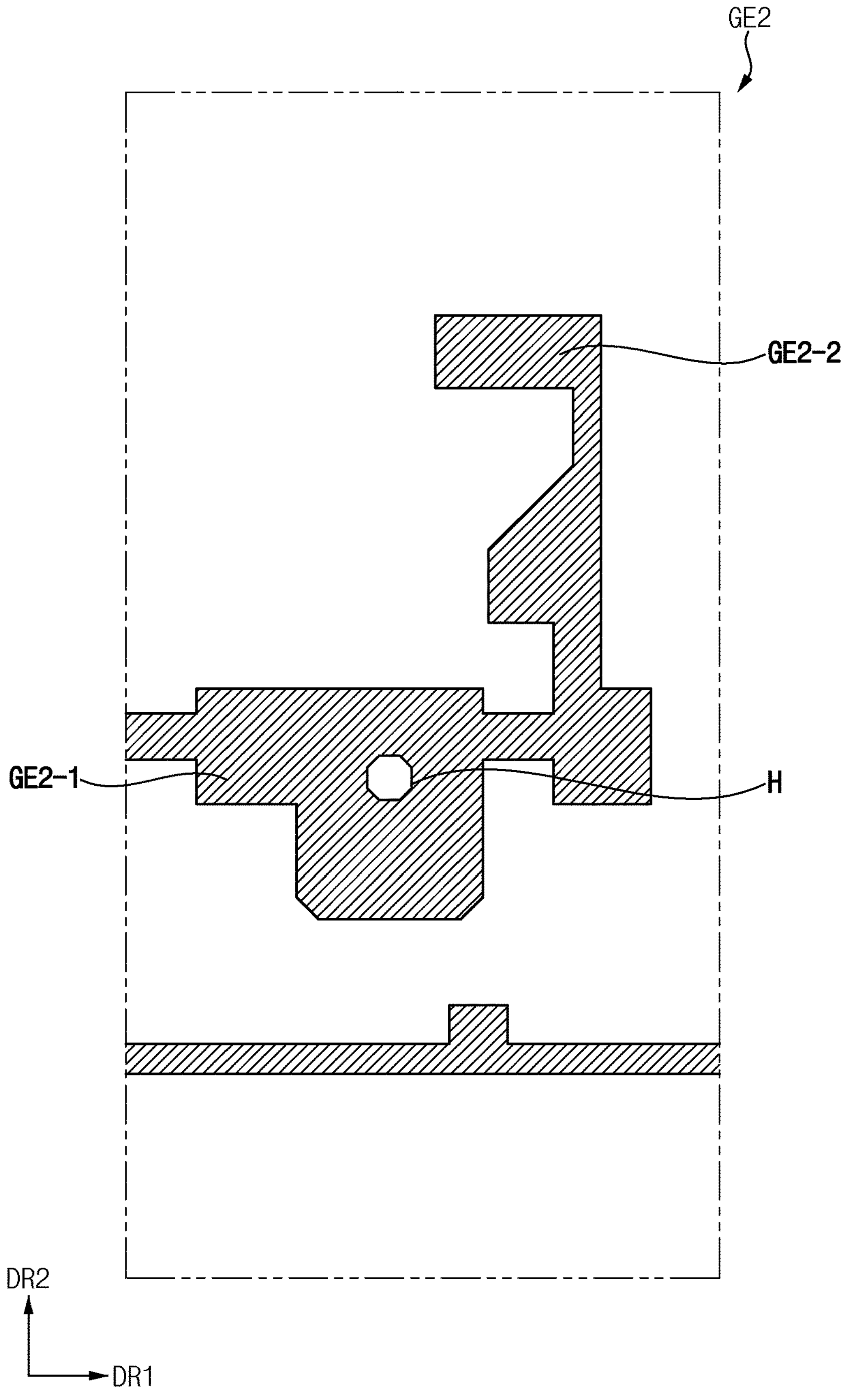

Referring to FIG. 7, a second gate electrode GE2 may be located on (e.g., above) the first gate electrode GE1. The second gate electrode GE2 may include a 2-1 sub gate electrode GE2-1 and a 2-2 sub gate electrode GE2-2.

The 2-1 sub gate electrode GE2-1 may extend in the first direction DR1. In addition, the 2-2 sub gate electrode GE2-2 may extend in a second direction DR2 crossing the first direction DR1. The 2-1 sub gate electrode GE2-1 may include a hole H. The hole H may overlap the 1-4 sub gate electrode GE1-4.

The second gate electrode GE2 may include a metal, an alloy, a conductive metal oxide, a transparent conductive material, and the like. These materials may be used alone or in combination with each other.

Figure 8:
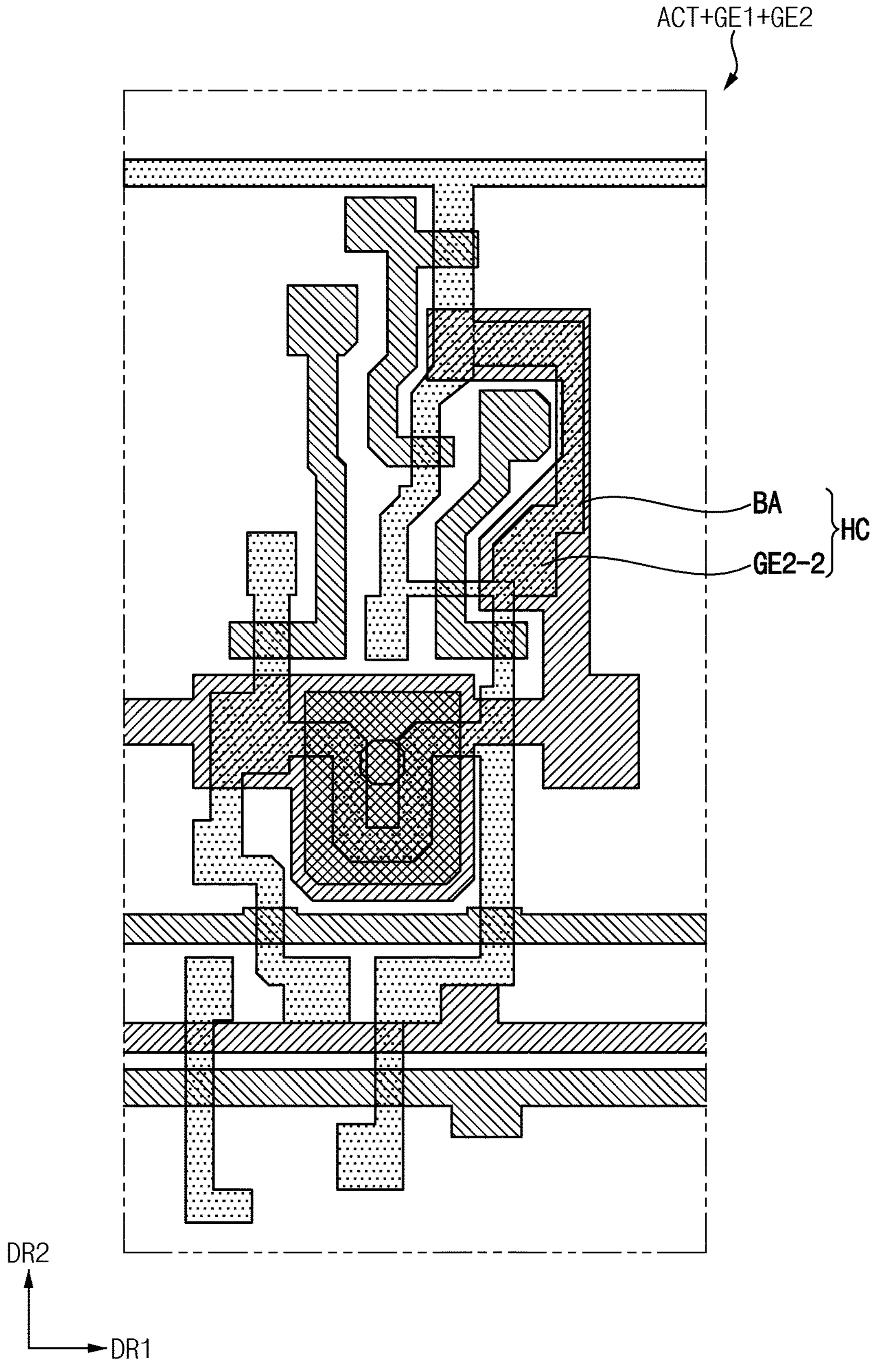

Referring to FIGS. 5, 7, and 8, the hold capacitor HC may include the intermediate area BA of the active pattern ACT, and a portion of the 2-2 sub gate electrode GE2-2 overlapping the intermediate area BA of the active pattern ACT.

In addition, the 1-4 sub gate electrode GE1-4, and the 2-1 sub gate electrode GE2-1 overlapping the 1-4 sub gate electrode GE1-4, may constitute the storage capacitor of FIG. 3

Figure 9:
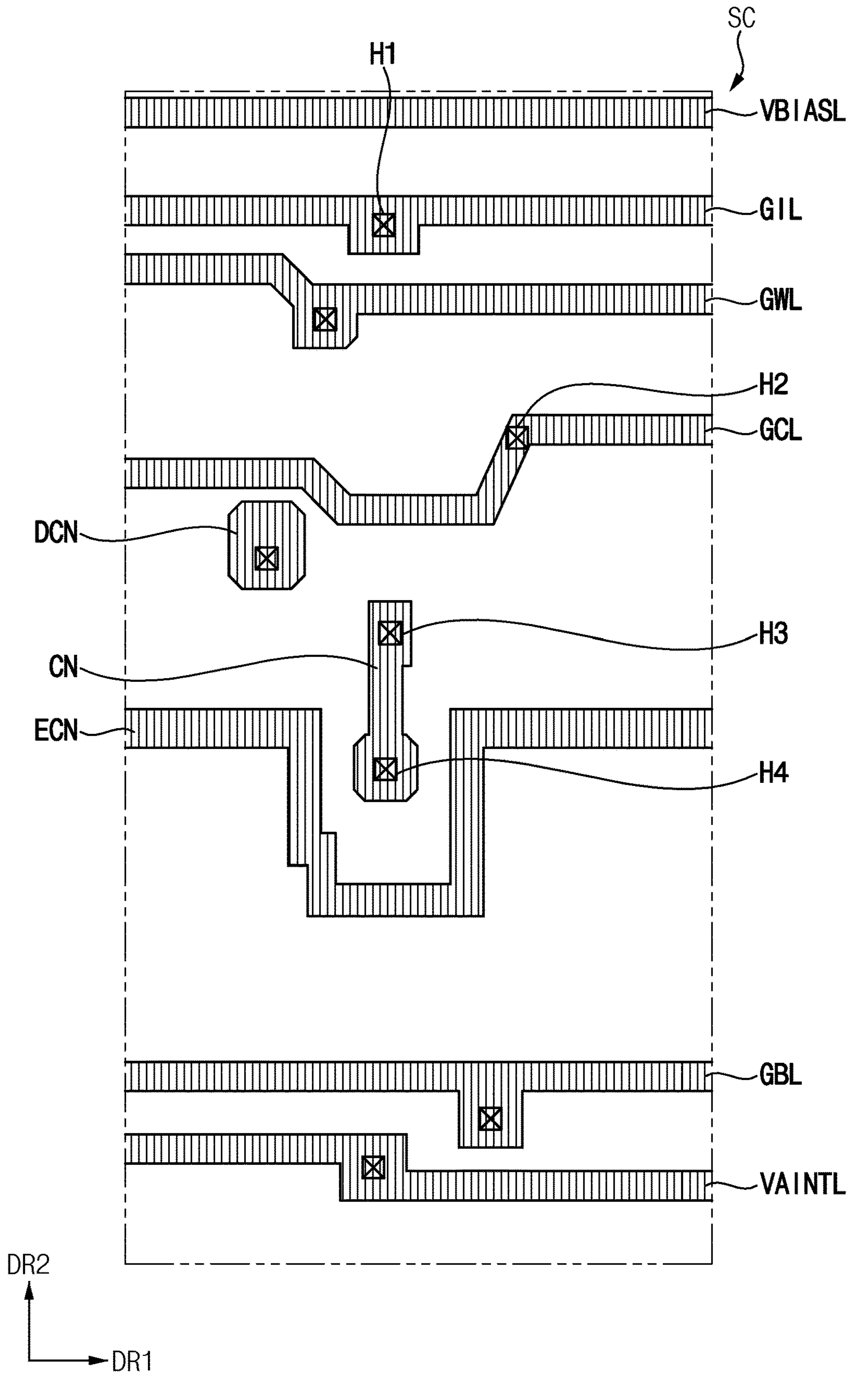
Figure 10:
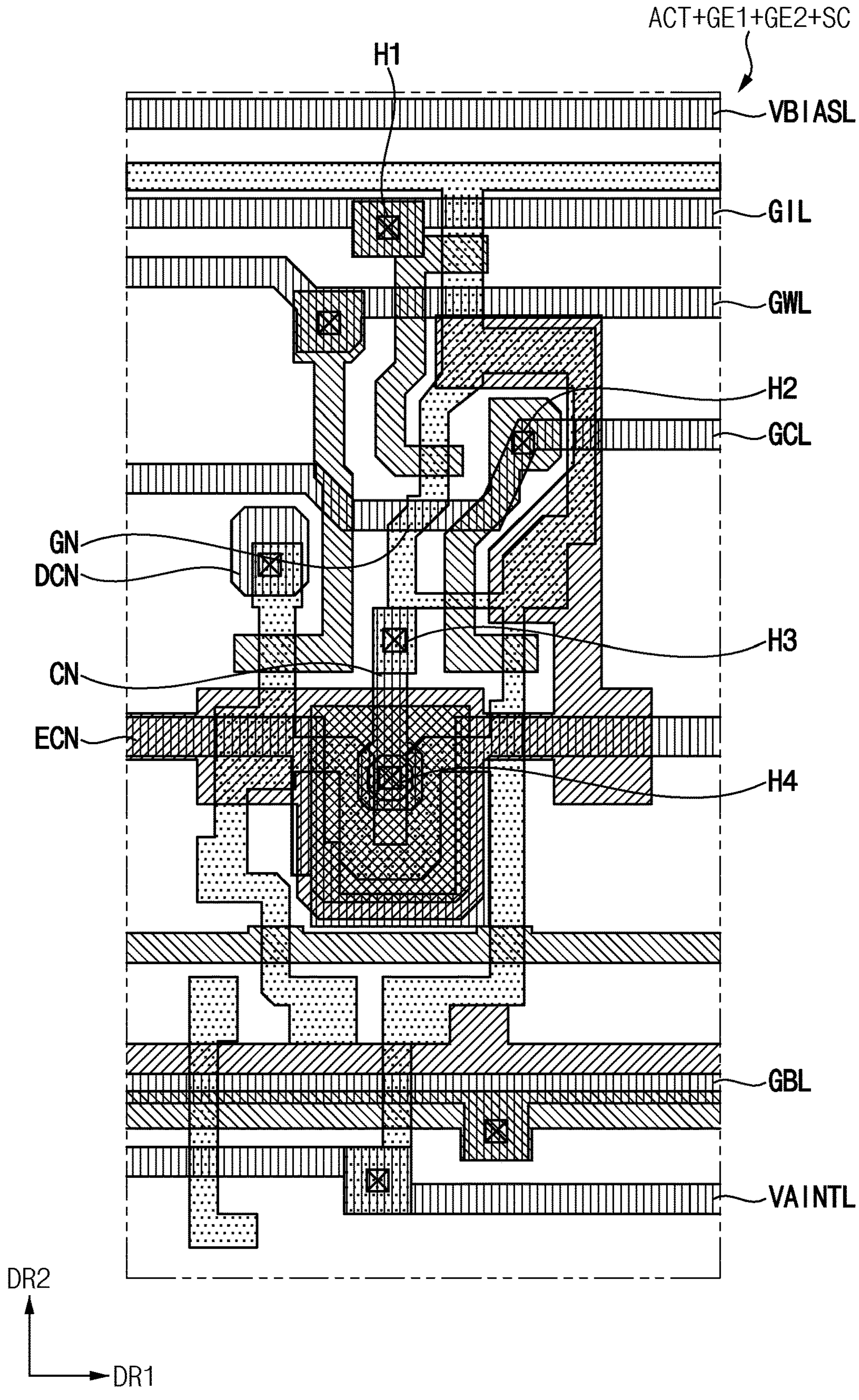

Referring to FIGS. 5, 9, and 10, source electrodes SC may be located on (e.g., above) the second gate electrode GE2. The source electrodes SC may include a first scan line GCL, a second scan line GWL, a third scan line GIL, a fourth scan line GBL, a bias voltage line VBIASL, a light-emitting element initialization voltage line VAINTL, a power voltage connection pattern ECN, a data voltage connection pattern DCN, and a connection pattern CN.

The source electrodes SC may include a metal, an alloy, a conductive metal oxide, a transparent conductive material, and the like. These materials may be used alone or in combination with each other.

The first scan line GCL may transmit the compensation gate signal GC to the plurality of pixels. The second scan line GWL may transmit the data write gate signal GW to the plurality of pixels. The third scan line GIL may transmit the data initialization gate signal GI to the plurality of pixels. The fourth scan line GBL may transmit the bias gate signal GB to the plurality of pixels. The bias voltage line VBIASL may transmit the bias voltage VBIAS to the plurality of pixels. The light-emitting element initialization voltage line VAINTL may transmit the light-emitting element initialization voltage VAINT to the plurality of pixels.

In one or more embodiments, the first, second, third, and fourth scan lines GCL, GWL, GIL, GBL, the bias voltage line VBIASL, and the light-emitting element initialization voltage line VAINTL may extend in the first direction DR1.

The power voltage connection pattern ECN may provide a power voltage (e.g., the first power voltage ELVDD of FIG. 3) to the active pattern ACT. The power voltage connection pattern ECN may extend in the first direction DR1.

The data connection pattern DCN may provide a data voltage (e.g., the data voltage DATA of FIG. 3) to the active pattern ACT.

The third scan line GIL and the 1-3 sub gate electrode GE1-3 may be connected through a first contact hole H1. The first scan line GCL and the 1-2 sub gate electrode GE1-2 may be connected through a second contact hole H2. The connection pattern CN may connect a portion of the third area (e.g., the third area A3 of FIG. 4) to the 1-4 sub-gate electrode GE1-4. The third area and the connection pattern CN may be connected through a third contact hole H3. The 1-4 sub gate electrode GE1-4 and the connection pattern CN may be connected through the fourth contact hole H4.

Referring to FIGS. 4, 6, 9, and 10, the first scan line GCL may be located to partially overlap a portion of the third area A3.

The gate node GN may refer to a portion of the third area A3 of the active pattern ACT. In one or more embodiments, the first scan line GCL may be located to partially overlap the gate node GN. The gate node GN of FIG. 10 may mean the same configuration as the gate node GN of FIG. 3.

In one or more embodiments, the first scan line GCL may partially overlap the 2-2 sub gate electrode (e.g., the 2-2 sub gate electrode GE2-2 of FIG. 7). In one or more embodiments, the first scan line GCL may partially overlap the intermediate area BA of the active pattern ACT.

Figure 11:
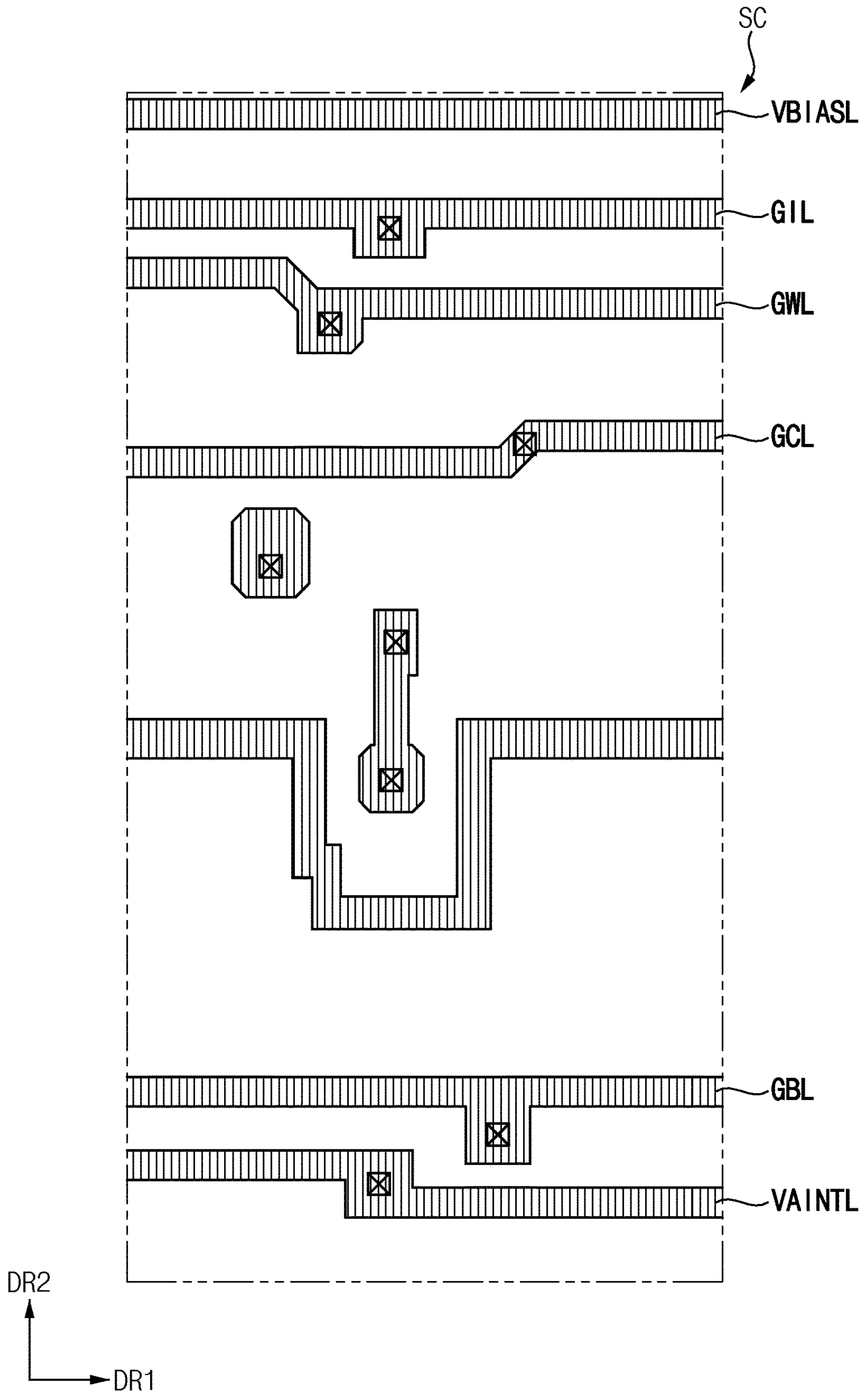
FIGS. 11 to 14 are arrangement views a display device according to one or more other embodiments.
Figure 12:
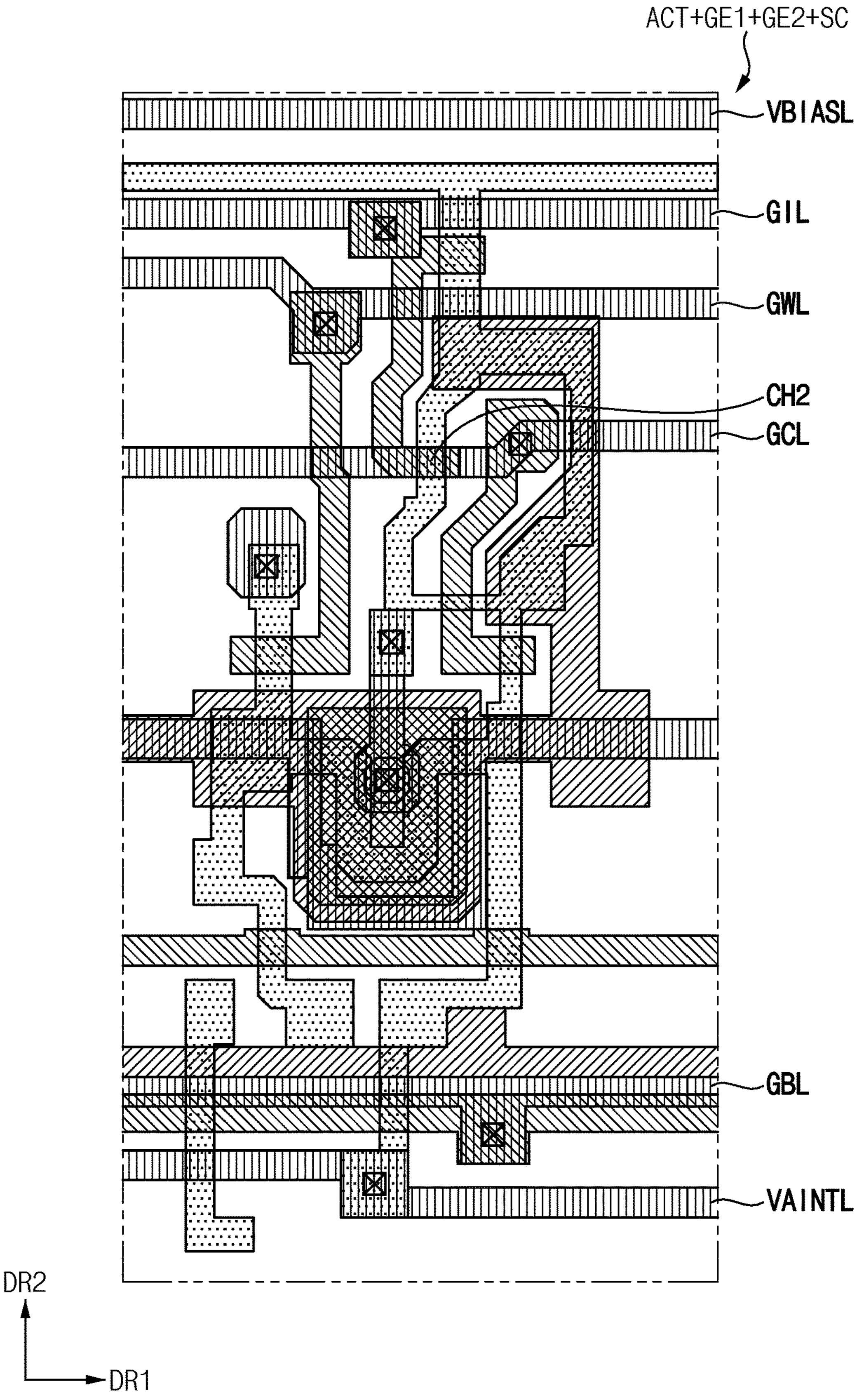
Figure 13:
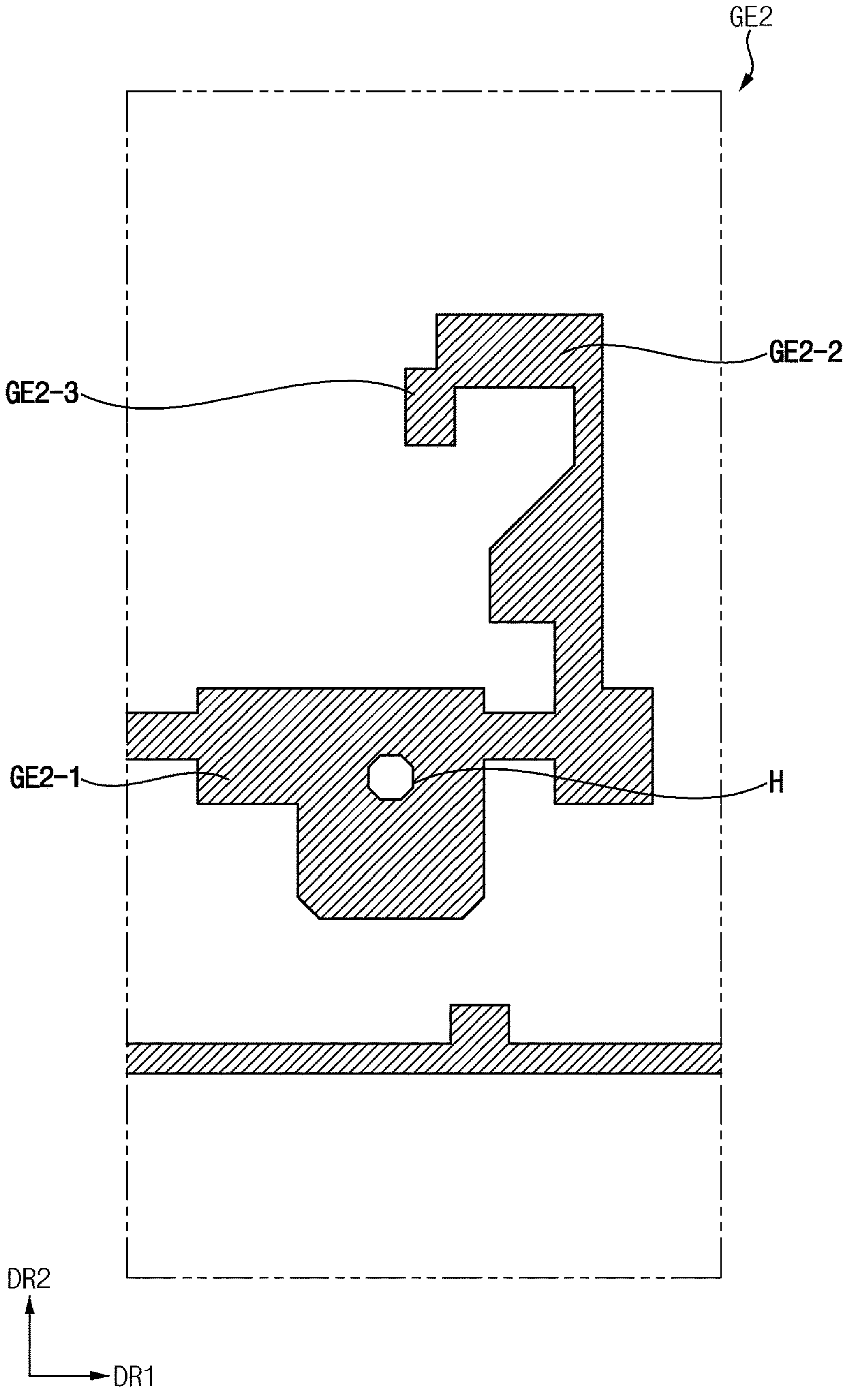

FIGS. 11 to 14 are arrangement views illustrating a display device according to one or more other embodiments. For example, FIG. 11 is an arrangement view illustrating source electrodes SC according to one or more other embodiments. In addition, FIG. 13 is an arrangement view illustrating a second gate electrode according to one or more other embodiments.

In describing FIGS. 11 to 14, substantially the same components as those of the display device according to one or more embodiments of FIGS. 4 to 10 are denoted by the same reference numerals and a detailed description thereof may be omitted.

Referring to FIGS. 11 and 12, the first scan line GCL according to one or more other embodiments may partially overlap the second channel area CH2. Referring to FIGS. 3 and 9 to 12, when the compensation gate signal GC transitions from the low signal to the high signal, the first compensation switching element T3-1 and the second compensation switching element T3-2 may be turned off.

Accordingly, when the compensation gate signal GC transitions from the low signal to the high signal, the kickback voltage may be generated limited to the intermediate area (e.g., the intermediate area BA of FIG. 4). That is, the kickback voltage may be generated only in the intermediate area, and may not be generated in the gate electrode G1 of the driving element T1.

Accordingly, a voltage difference may occur between the intermediate area and the gate electrode G1 of the driving element T1. Accordingly, a leakage current flowing to the gate electrode G1 of the driving element T1 may be generated in the intermediate area.

A first scan line according to the comparative example may be located to overlap a portion of the second area (e.g., the second area A2 of FIG. 4). In contrast, the first scan line CGL according to one or more embodiments of the present disclosure may be located to partially overlap the gate node GN or to partially overlap the second channel area CH2.

Accordingly, the kickback voltage that can be generated in the intermediate area may be reduced. Accordingly, the leakage current that can be generated due to a voltage difference between the intermediate area and the gate electrode G1 of the driving element T1 may be reduced.

Figure 14:
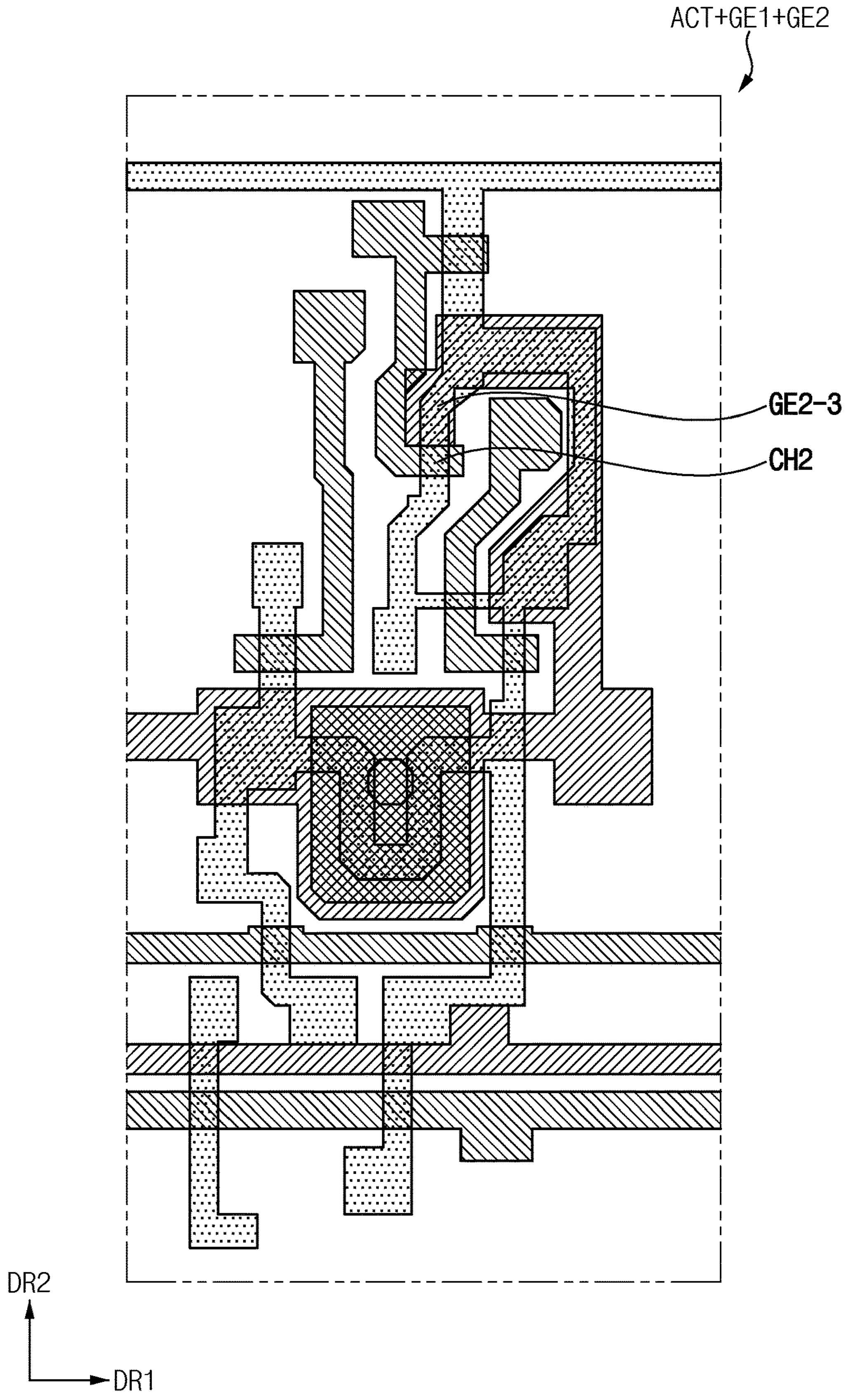

Referring to FIGS. 13 and 14, the second gate electrode GE2 according to one or more other embodiments may include a 2-1 sub gate electrode GE2-1, a 2-2 sub gate electrode GE2-2, a 2-3 sub gate electrode GE2-3 and a hole H.

The 2-1 sub gate electrode GE2-1 may extend in the first direction DR1. The 2-2 sub gate electrode GE2-2 may extend in the second direction DR2. The 2-3 sub gate electrode GE2-3 may protrude from an end of the 2-2 sub gate electrode GE2-2 to overlap the second channel area CH2.

As described above, the 2-3 sub-gate electrode GE2-3 may be located on (e.g., above) the active pattern ACT. In addition, the first scan line GCL may be located on the 2-3 sub gate electrode GE2-3.

Therefore, the kickback voltage that can occur in the active pattern ACT may be reduced when the compensation gate signal GC transitions from a low signal to a high signal by the 2-3 sub gate electrode GE2-3 located between the active pattern ACT and the first scan line GCL.

The present disclosure can be applied to various display devices. For example, the present disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims, with functional equivalents thereof to be included therein.

What is claimed is:

1. A display device comprising:

an active pattern comprising first, second, third, and fourth channel areas, an intermediate area, and first, second, third, fourth, and fifth areas;

a first gate electrode above the active pattern;

a second gate electrode above the first gate electrode;

a first scan line above the second gate electrode, configured to transmit a gate signal, and partially overlapping the third area;

a 2-2 switching element comprising the first channel area, a portion of the first area, a portion of the second area, and a first portion of the first gate electrode that overlaps the first channel area;

a 2-1 switching element comprising the second channel area, a portion of the second area, a portion of the third area, and a second portion of the first gate electrode that overlaps the second channel area;

a 1-1 switching element comprising the third channel area, a portion of the third area, a portion of the fourth area, and a third portion of the first gate electrode that overlaps the third channel area;

a 1-2 switching element comprising the fourth channel area, a portion of the fourth area, a portion of the fifth area, and a fourth portion of the first gate electrode that overlaps the fourth channel area; and a capacitor comprising the intermediate area and a part of the second gate electrode that overlaps the intermediate area.

2. The display device of claim 1, wherein a width of the first channel area is greater than a width of the second channel area.

3. The display device of claim 1, wherein a width of the fourth channel area is greater than a width of the third channel area.

4. The display device of claim 1, wherein the second gate electrode comprises:

a first portion extending in a first direction;

a second portion extending in a second direction that crosses the first direction; and a third portion protruding from an end of the second portion to overlap the second channel area.

5. The display device of claim 1, wherein the first scan line partially overlaps the intermediate area.

6. The display device of claim 3, wherein the gate signal comprises a compensation gate signal.

* * * * *